United States Patent [19]

Baird, Jr.

[11] Patent Number: 4,746,418

[45] Date of Patent: May 24, 1988

[54] POLYMETALLIC REFORMING CATALYSTS, THEIR PREPARATION AND USE IN REFORMING

[75] Inventor: William C. Baird, Jr., Baton Rouge, La.

[73] Assignee: Exxon Research and Engineering Company, Florham Park, N.J.

[21] Appl. No.: 2,157

[22] Filed: Jan. 12, 1987

[51] Int. Cl.$^4$ ............................................. C10G 35/06
[52] U.S. Cl. .................................... 208/139; 208/140
[58] Field of Search .............................. 208/139, 140

[56] References Cited

U.S. PATENT DOCUMENTS

| | | | |
|---|---|---|---|
| 3,981,823 | 9/1976 | Yates .................................. | 208/140 |
| 4,430,517 | 2/1984 | Imai et al. ............................ | 585/660 |
| 4,487,848 | 12/1984 | Robinson et al. .................... | 502/223 |
| 4,517,076 | 5/1985 | Boyle et al. ......................... | 208/140 |
| 4,518,708 | 5/1985 | Krishnamurthy et al. ......... | 208/139 |
| 4,522,935 | 6/1985 | Robinson et al. .................... | 502/223 |

Primary Examiner—Curtis R. Davis
Attorney, Agent, or Firm—Roy J. Ott

[57] ABSTRACT

A catalyst useful for reforming a naphtha feed at reforming conditions which comprises an iridium component dispersed throughout and bound within an alumina support matrix, a platinum component dispersed upon said iridium-containing alumina support, and halogen. In all of its aspects, the iridium component will remain in its dispersed state, without significant agglomeration, when subjected to temperatures in the presence of oxygen for extended periods sufficient to agglomerate presently known halogenated platinum-iridium catalysts. This catalyst is prepared in an initial step by dispersing the iridium within the alumina matrix, and then calcining the iridium-containing alumina at high temperature to bind the iridium within the alumina support matrix. The platinum, or platinum and additional metal promoters, especially rhenium, is then impregnated upon the iridium-alumina support. This catalyst can be used in reforming at reforming conditions to provide high activity, high activity maintenance, high sulfur tolerance, low coke make and high $C_5+$ liquid volume yield.

6 Claims, No Drawings

POLYMETALLIC REFORMING CATALYSTS, THEIR PREPARATION AND USE IN REFORMING

FIELD OF THE INVENTION

This invention relates to novel catalyst compositions, a process for reforming naphthas by reaction over said polymetallic reforming catalysts to improve their octane number, and to a process for the preparation of said catalysts. In particular, it relates to novel high activity, high activity maintenance iridium-containing platinum catalysts, their use in reforming, and their preparation.

BACKGROUND

Catalytic reforming, or hydroforming, is a well established industrial process employed by the petroleum industry for improving the octane quality of naphthas or straight run gasolines. In reforming, a multi-functional catalyst is employed which contains a metal hydrogenation-dehydrogenation (hydrogen transfer) component, or components, substantially atomically dispersed upon the surface of a porous, inorganic oxide support, notably alumina. Platinum metal catalysts, or platinum to which one or more additional metal promoters have been added to form polymetallic catalysts are currently employed, reforming being defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst.

In a reforming operation, one or a series of reactors, providing a series of reaction zones, are employed. Typically, a series of reactors are employed, e.g., three of four reactors, these constituting the heart of the reforming unit. Each reforming reactor is generally provided with a fixed bed, or beds, of the catalyst, each receives down-flow feed, and each is provided with a preheater or interstage heater, because the reactions which take place are endothermic. A naphtha feed, with hydrogen, is cocurrently passed through a preheat furnace and reactor, and then in sequence through subsequent interstage heaters and reactors of the series. The product from the last reactor is separated into a $C_5+$ liquid fraction which is recovered, and a vaporous effluent. The vaporous effluent is a gas rich in hydrogen, and usually contains small amounts of normally gaseous hydrocarbons, from which hydrogen is separated and recycled to the process to minimize coke production.

The sum-total of the reforming reactions occurs as a continuum between the first and last reaction zone of the series, i.e., as the feed enters and passes over the first fixed catalyst bed of the first reactor and exits from the last fixed catalyst bed of the last reactor of the series. During an on-oil run, the activity of the catalyst gradually declines due to the build-up of coke on the catalyst, and hence during operation, the temperature of the process is gradually raised to compensate for the activity loss caused by the coke deposition. Eventually, however, economics dictate the necessity of reactivating the catalyst. Consequently, in all processing of this type the catalyst must necessarily be periodically regenerated by burning off the coke in the presence of an oxygen-containing gas at controlled conditions. Catalyst reactivation is then completed in a sequence of steps wherein the agglomerated metal hydrogenation-dehydrogenation components are atomically redispersed.

Regeneration processes are basically of two types. In a semi-regenerative process, the entire unit is operated by gradually and progressively increasing the temperature to maintain the activity of the catalyst, caused by the coke deposition, until finally the entire unit is shut down for regeneration, and reactivation, of the catalyst. After regeneration, and reactivation of the catalyst the unit is put back on-oil. In a cyclic regeneration process, the reactors are individually isolated, or in effect swung out of line by various manifolding arrangements, motor operated valving and the like. The catalyst is regenerated to remove the coke deposits, and then reactivated while the other reactors of the series remain on stream. A "swing reactor" temporarily replaces a reactor which is removed from the series for regeneration and reactivation of the catalyst, until it is put back in series. The cyclic method of regeneration offers advantages over the semi-regenerative type process in that the catalyst, because it can be continuously regenerated, and reactivated, without shutting down the unit, suffers no loss in production. Moreover, because of this advantage the unit can be operated at higher severities to produce higher $C_5+$ liquid volume yields of high octane gasoline than semi-regenerative reforming units.

In reforming, there is a contemporary need for a high activity, high yield, sulfur tolerant, low coke make catalyst. High yields of aromatics rich reformate relieve the yield/octane pressure arising from lead removal. High activity relieves reactor volume-limited refineries and compensates for reduced refinery capacity by permitting higher naphtha feed throughput. Greater sulfur tolerance permits relaxation of feed hydrofining severities, this providing process energy and hydrogen savings. Low coke formation extends the frequency of the regeneration, or permits shorter regeneration periods, or both. Thus, economic credits are provided by energy savings, or shorter off-oil intervals.

Catalysts constituted of platinum and iridium, with or without the presence of an additional promoter metal, or metals, are known to provide this combination of properties. Platinum-iridium catalysts are the most active of commercial reforming catalysts. For example, the ability of iridium to promote platinum activity provides catalytic activities two to four times that of the more conventional platinum and the now widely used platinum-rhenium catalysts, respectively, depending upon the platinum and iridium loadings. Unfortunately however, platinum-iridium catalysts unlike the platinum and platinum-rhenium catalysts all too readily agglomerate and inactivate upon exposure to oxygen at high temperatures. For this reason the wide application of platinum-iridium catalysts in commercial operations has been restricted, especially to exclude their use in cyclic reforming units, since time-consuming and inefficient regeneration procedures are required to avoid damaging the iridium. Known methods of regeneration thus utilize lengthy, low temperature coke burns in the presence of a chloride-rich environment to maintain the iridium in highly dispersed state. Low oxygen concentrations in the combustion gas are also employed during the combustion period to hold the flame front temperature below about 800° F. (426.7° C.). The use of chloride during this prolonged burning period in itself creates a number of troublesome problems. For example, the use of scrubbing equipment is required to remove the corrosive chloride containing gases from the gas recycle stream. Moreover, volatile iron chlorides are formed by reaction of the chlorine with reactor walls, and the deposition of these iron salts on the reforming catalyst contributes to poor on-oil performance. Despite the admirable properties of platinum-iridium catalysts for on-oil use, the tendency of the iridium component of the catalyst to agglomerate on regeneration thus imposes a major liability upon the use of these catalysts; especially, as relates to their use in cyclic regeneration operations.

OBJECTS

It is, accordingly, a primary objective of the present invention to provide a novel high activity, high $C_5+$ liquid volume yield, sulfur tolerant, low coke-make platinum-iridium catalyst which, when required, can be regenerated by the more conventional rapid, high temperature, high oxygen chloride-free coke burns for extended periods without producing agglomeration of the iridium component of the catalyst.

It is, in particular, an object to provide a novel platinum-iridium catalyst as characterized by the iridium component of which is highly resistant to agglomeration and which, when required, can be regenerated at the higher severity conditions typical of those employed for the regeneration of non (iridium-containing) catalysts, e.g., an unpromoted platinum catalyst or a platinum-rhenium catalyst.

A further object is to provide a novel reforming process utilizing said catalyst which during on-oil use will provide high activity, high activity-maintainance, high sulfur tolerance, low coke formation, and high $C_5+$ liquid volume yield.

A further, and more specific object is to provide a novel process employing said iridium-agglomeration resistant platinum-iridium catalyst for use during on-oil operations to provide these advantages, inclusive particularly of a process providing a more sulfur tolerant catalyst for which reason the rate of hydrogenolysis of a feed to methane is lowered and $C_5+$ liquid volume yield increased, thereby broadening the usage of such catalysts to encompass cyclic reforming operations.

It is also an object of this invention to provide a process for the production of said novel platinum-iridium catalysts.

THE INVENTION

These and other objects are accomplished in accordance with the present invention which encompasses:

(a) A novel catalyst comprised of an iridium component dispersed throughout and bound within an alumina matrix, upon which a platinum component is impregnated. The iridium component of this catalyst, in contrast to conventional platinum-iridium catalysts, is physically dispersed throughout an alumina matrix, and bound therein sufficiently that the iridium component thereof remains physically dispersed even when the composition is subjected to temperatures ranging above about 426.7° C. (800° F.), suitably from about 450° C. to about 650° C., at oxygen concentrations ranging above about 0.1 percent, suitably from about 0.1 percent to about 21 percent, based on the volume of gas, for periods ranging from about 1 hour to about 48 hours, preferably from about 3 hours to about 24 hours such as is employed in a typical process for the regeneration of a platinum catalyst or a platinum-rhenium catalyst. The iridium component is dispersed and bound within the alumina matrix such that it does not agglomerate as a consequence of its method of preparation (c), infra. The platinum component is then impregnated upon the iridium-containing inorganic oxide, or alumina component by conventional techniques, and the platinum-iridium catalyst so formed is then dried, calcined, reduced and sulfided by conventional techniques.

(b) A process for reforming a naphtha feed at reforming conditions by contacting said feed, and hydrogen, with the finished catalyst of (a), supra.

(c) A process for the preparation of the catalyst of (a), supra, which comprises dispersing iridium throughout an alumina solid matrix by (i) admixing an iridium compound, or salt, and a slurry of aluminum hydroxide, or (ii) coprecipating from a solvent, preferably an aqueous solvent, an iridium compound, or salt, and aluminum hydroxide, removing the iridium-containing aluminum hydroxide solid from the slurry or solvent, and calcining said solid at temperature sufficient to bind the iridium within the alumina matrix such that the iridium component of the iridium-alumina composition will not agglomerate when subjected to temperatures above about 426.7° C., suitably from about 450° C. to about 650° C., at oxygen concentrations ranging from about 0.1 percent to about 21 percent, especially from about 0.3 percent to about 21 percent, based on the volume of the gas, for periods ranging from about 1 hour to about 48 hours, preferably from about 3 hours to about 24 hours. In general, the temperature required for calcination of the iridium-alumina composite solid approximates that required to convert alpha-alumina to gamma-alumina, and generally ranges from about 370° to about 700° C., preferably from about 425° C. to about 650° C., and more preferably from about 510° C. to about 540° C. The period of treatment at these temperatures can range from about 1 hour to about 72 hours, generally from about 3 hours to about 48 hours, preferably from about 6 hours to about 36 hours, and more preferably from about 12 hours to about 24 hours.

The source of the alumina is not critical though the starting material must meet the well known, and established purity specifications for reforming catalyst bases. The salts of aluminum with the common mineral and carboxylic acids, the alkoxides of aluminum with the common $C_1$–$C_4$ alcohols, and the alkyls of aluminum bearing $C_1$–$C_{12}$ radicals are all suitable. Representative aluminum compounds include the chloride, bromide, nitrate, nitrite, acetate, benzoate, methoxide, ethoxide, butoxide, triethyl, tributyl, tridecyl, and the like.

Precipitation of the iridium-containing aluminum hydroxide solid is preferably performed in an aqueous, basic medium which may or may not include a cosolvent such as an ester, ketone, alcohol, or hydrocarbon, the need for which is a function of the aluminum source. Basic ammonium salt solutions are preferred precipitating agents. Aqueous solutions of ammonium hydroxide, carbonate, bicarbonate, acetate and urea are suitable, with ammonium hydroxide being preferred.

Iridium may be supplied as one of its common salts or complexes. The salts of iridium with the common mineral acids are suitable such as iridium chloride, nitrate, and chloroiridic acid. The latter is preferred. Ammine complexes of iridium are also suitable. As stated, the iridium source may either be added to the freshly precipitated alumina, or the iridium may be coprecipitated with the alumina. The quantity of iridium used is determined by the iridium content desired in the finished catalyst. The iridium content of the finished catalyst ranges from about 0.001 percent to about 2 percent, preferably from about 0.01 percent to about 1.5 percent, and more preferably from about 0.01 percent to about 1 percent, based on the weight of the catalyst (dry basis).

The platinum component can be impregnated into the calcined iridium-alumina composition in conventional manner to form the catalyst. The powdery iridium-containing alumina hydroxide solid material recovered from the slurry or solvent, described in c(i) or c(ii), supra, can be extruded, pressed, pilled, pelleted, beaded, or otherwise shaped either prior or subsequent to the required calcination. The platinum is deposited on this particulate solid material by the impregnation method. Pursuant to the impregnation method, the particulate iridium-containing solid in calcined state is contacted and thereby impregnated by either the "incipient wetness" technique, or a technique embodying absorption from a dilute or concentrated solution, or solutions, with subsequent filtration or evaporation to effect total uptake of the platinum component.

The impregnation of the platinum, or platinum and other components, into the solid is carried out by impregnating the solid with a solution or solutions, of the respective salts or compounds of the elements or metals to be incorporated with the iridium-containing solid. Salts, acids or compounds of each metal can be dissolved in a solution, or the salts, acids or compounds can be separately dissolved in solutions, the solutions admixed, and the admixed solution used for impregnation of the solid. In other words, platinum is added initially using conventional techniques, and then the other metals are added simultaneously or sequentially, suitably by impregnation. The amount of impregnation solution used should be sufficient to completely immerse the solid, usually within the range from about 1 to 20 times of the solid by volume, depending on the metal concentration in the impregnation solution. The impregnation treatment of the iridium-containing solid can be carried out under a wide range of conditions including ambient or elevated temperatures and atmospheric or supratmospheric pressures.

The catalyst is one which contains platinum as an essential component, generally in concentration ranging from about 0.001 percent to about 2 percent, preferably from about 0.01 percent to about 1.5 percent, and more preferably from about 0.05 percent to about 1 percent, based on the weight of the catalyst (dry basis). The catalyst, as stated, also contains iridium as an essential component, generally in concentration ranging from about 0.001 percent to about 2 percent, preferably from about 0.01 percent to about 1.5 percent, and preferably from about 0.01 percent to about 1 percent, based on the weight of the catalyst (dry basis). An additional metal, or metals, as modifiers or promoters can be added to the catalyst. Such metals include copper, tin, rhenium, palladium, rhodium, tungsten, ruthenium, osmium, silver, gold, gallium, lead, bismuth, antimony and the like. These modifiers, or promoters, are generally added in concentrations ranging from about 0.001 percent to about 1 percent, preferably from about 0.01 percent to about 0.7 percent, based on the weight of the catalyst composition (dry basis). Suitably, the salts or compounds of one or more of these metals are dissolved in a suitable solvent, preferably water, to form a solution, or each moiety in separately dissolved in a solution, the solutions admixed and the admixed solution used for impregnation of the catalyst. The concentration of the salt or compound in the impregnation solution is adequate to impregnate a sufficient amount of the metals into the catalyst, as is desired.

Halogen, preferably chlorine, is an essential component, the halogen content of the catalyst generally ranging from about 0.01 percent to about 2 percent, preferably from about 0.3 percent to about 1.6 percent, more preferably from about 0.6 percent to about 1.5 percent, and most preferably from about 0.9 percent to about 1.3 percent, based on the weight of the catalyst (dry basis).

Halogen can be introduced into the catalyst by any method and at any time of the catalyst preparation, for example, prior to, following or simultaneously with the impregnation of the platinum and iridium, or additional metal or metals components. In the usual operation, the halogen component is introduced simultaneously with the incorporation of the platinum metal component. Halogen can also be introduced by contacting the solids material in a vapor phase or liquid phase with a halogen compound such as hydrogen fluoride, hydrogen chloride, ammonium chloride, or the like.

Sulfur is a preferred component. The sulfur content of the catalyst generally ranges from about 0.01 percent to about 0.2 percent, preferably from about 0.02 percent to about 0.1 percent, based on the weight of the catalyst (dry basis). The sulfur can be added to the catalyst by conventional methods, suitably by breakthrough sulfiding a bed of the catalyst with a sulfur-containing gaseous stream, e.g., hydrogen sulfide in hydrogen, performed at temperatures of from about 175° C. to about 560° C. and at temperatures of from about atmospheric to about 500 pounds for the time necessary to achieve breakthrough, or the desired sulfur level.

The catalyst, after impregnation with the platinum, or platinum and promoter metals, is dried by heating at a temperature above about 27° C., preferably between about 65° C. and 150° C., in the presence of nitrogen or oxygen, or both, in air stream or under vacuum. The catalyst after addition of the platinum is calcined at a temperature between about 450° C. to about 650° C., preferably about 450° C. to 560° C., in the presence of oxygen in an air stream or in the presence of a mixture of $O_2$ and inert gas. This calcination or activation is conducted for periods ranging from about 1 to about 24 hours in either flowing or static gases. Reduction is performed by contact with flowing hydrogen at temperatures ranging from about 175° C. to about 560° C. for periods ranging from about 0.5 to about 24 hours at about 1–40 atm. The catalyst can be sulfided by use of a blend of $H_2S/H_2$ and performed at temperature ranging from about 175° C. to about 560° C. at about 1–40 atm. for a time necessary to achieve breakthrough, or the desired sulfur level. Post-sulfiding stripping can be employed if desired at conditions similar to those for reduction of the catalyst.

These catalysts can be used in semi-regenerative, cyclic, semi-cyclic, or continuous bed reforming. Unlike prior iridium-containing catalysts, these catalysts are particularly useful in cyclic reforming operations.

The feed or charge stock contacted with the catalyst at reaction conditions can be a virgin naphtha, cracked naphtha, a Fischer-Tropsch naphtha, or the like. Typical feeds are those hydrocarbons containing from about 5 to about 12 carbon atoms, or more preferably from about 6 to about 9 carbon atoms. Naphthas, or petroleum fractions boiling within the range of from about 27° C. to about 235° C., and preferably from about 50°

C. to about 190° C., contain hydrocarbons of carbon numbers within these ranges. Typical fractions thus usually contain from about 20 to about 80 Vol.% paraffins, both normal and branched, which fall in the range of about $C_5$ to $C_{12}$, from about 10 to 80 Vol.% of naphthenes falling within the range of from about $C_6$ to $C_{12}$, and from 5 through 20 Vol.% of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
|---|---|---|
| Pressure, Psig | 50–750 | 100–300 |
| Reactor Temp., °C. | 400–600 | 465–540 |
| Gas Rate, SCF/B (Incl. Recycle Gas) | 1500–10,000 | 2000–7000 |
| Feed Rate, W/Hr/W | 0.5–10 | 1–3 |

This invention, and its principle of operation, will be better understood by reference to the following demonstrations and examples which illustrate its more salient features. All parts are in terms of weight except as otherwise specified.

EXAMPLES

For use in conducting a first series of runs, as described below, catalysts were prepared by dispersing platinum, or both platinum (Pt) and iridium (Ir), or both platinum and rhenium (Re), onto portions of an alumina support. In preparation of the platinum-iridium catalysts, a first of these, Catalyst A, was prepared by the process of this invention, viz. by first dispersing the iridium into the support, and then calcining the iridium-containing support at sufficiently high temperature to bind the iridium within the support after which time the platinum was impregnated onto the iridium-alumina support in conventional manner to form the catalyst composition of this invention. Catalysts B and C, and all other catalysts designated hereafter as obtained from a catalyst manufacturer, were prepared in conventional procedures from a high purity calcined alumina coimpregnated with an aqueous solution containing both chloroiridic acid and chloroplatinic acid, each in concentration sufficient to impregnate the desired amount of each metal, respectively, onto the catalyst support. The impregnated platinum-iridium catalysts were then dried at 260° C. prior to shipment to the consumer. The novel platinum-iridium catalyst is compared with the conventional platinum-iridium, and the platinum (Catalyst D) and platinum-rhenium (Catalyst E) catalysts at similar conditions to reform heptane.

The catalysts are described, along with their methods of preparation, as follows:

Catalyst A (0.5 wt.% Pt/0.3 wt.% Ir):

A solution of 255 g of aluminum tri-sec-butoxide in 1275 ml of isopropyl alcohol was placed in a 3 l beaker. A 10% ammonium hydroxide solution (1000 ml) was added dropwise with stirring. The precipitated aluminum hydroxide was filtered and thoroughly washed and dried. The dry powder (80 g) was suspended in 75 ml of water, and 9 ml of chloroiridic acid solution, 17 mg IR/ml, were added. The slurry was well mixed for 1 hr., and the water was removed under vacuum. The powder was vacuum dried at 110° C. for 4 hr. and was pressed into 14–35 mesh (Tyler) particles. The meshed material was calcined in flowing air at 950° F. (510° C.) for 18 hr. No Ir oxide crystallinity was detectable in the calcined material by the standard X-ray analysis. The IR content of the support was nominally 0.3 wt.%.

The Ir containing alumina support, 25 g, was suspended in 40 ml of water; 5 ml of chloroplatinic acid, 25 mg Pt/ml, and 3 ml of chloride stock solution, 60 mg/ml, were added. After 4 hr. the 0.5 Pt-0.3 Ir catalyst was filtered, air dried overnight, and vacuum dried at 110° C. for 4 hr. The catalyst was calcined at 950° F. (510° C.) for 3 hr. in flowing air, reduced in hydrogen at 500° C. (932° F.) for 17 hr., and sulfided to breakthrough at 500° C. (932° F.). No Ir crystallinity was detected in the finished catalyst. This indicates that there is no Ir agglomeration.

Catalyst B (0.3 wt.% Pt/0.3 wt.% IR):

A conventional 0.3 wt.% Pt-0.3 wt.% Ir catalyst as received from the catalyst manufacturer was calcined at 398.2° C. (750° F.) for 3 hrs., reduced with hydrogen at 500° C. (932° F.) for 17 hrs., and breakthrough sulfided at 500° C. (932° F.). No iridium crystallinity was detected in this catalyst.

Catalyst C (0.3 wt.% Pt/0.3 wt.% Ir):

A portion of the catlyst as received from the manufacturer, viz. Catalyst B, was calcined at 510° C. (950° F.) for 3 hrs., and then reduced and sulfided as was Catalyst B. In this instance, the iridium crystallinity was measured at 68%. (Sixty-eight percent of the total iridium component contained Ir or IrO of size greater than 30 Angstrom Units.)

Catalyst D (0.6 wt.% Pt):

A commercial Pt catalyst, obtained from a catalyst manufacturer, was prepared as was Catalyst C, except of course no Ir was added to the alumina.

Catalyst E (0.3 wt.% Pt/0.3 wt.% Re):

A commercial Pt-Re catalyst obtained from a catalyst manufacturer, was pretreated at the conditions of Catalyst C in preparation for a reforming run.

Each of Catalysts A, B, C, D and E, respectively, were evaluated at similar conditions in a series of runs for heptane reforming. The results are given in Table 1.

TABLE 1

Heptane Reforming With Pt, Pt—Re, and Pt—Ir Catalysts
500° C., 100 psig, 20 W/H/W, $H_2$/Oil = 6

| | Run No. | | | | |
|---|---|---|---|---|---|
| Catalyst | 1 A(0.5 Pt- 0.3 Ir) | 2 B(0.3 Pt- 0.3 Ir) | 3 C(0.3 Pt- 0.3 Ir) | 4 D(0.6 Pt) | 5(1) E(0.3 Pt- 0.3 Re) |
| Ir Crystallinity, % | <5 | <5 | 68 | — | — |
| Yield, Wt. % | | | | | |
| $C_1$ | 1.9 | 1.8 | 1.3 | 1.1 | 1.5 |
| i-$C_4$ | 3.0 | 2.8 | 2.5 | 2.2 | 3.7 |
| n-$C_4$ | 5.0 | 5.0 | 4.0 | 3.6 | 5.8 |
| $C_5$+ | 80.0 | 80.4 | 84.2 | 86.1 | 78.0 |
| Toluene | 29.9 | 29.0 | 24.5 | 22.7 | 30.5 |
| Conversion, % | 64.7 | 62.7 | 51.5 | 46.8 | 67.8 |
| Toluene Rate | 6.1 | 6.0 | 5.0 | 4.7 | 3.0 |
| Toluene Selectivity, % | 45.9 | 46.2 | 47.3 | 48.1 | 45.5 |

(1)10 W/H/W

Comparison of Runs 1 and 2 shows that the catalyst of this invention, Catalyst A, where the Ir is incorporated into the alumina support is as active as the commercial Pt-Ir catalyst. When the commercial catalyst is calcined at 510° C. (950° F.), Ir agglomeration occurs, and catalyst activity as measured by overall conversion and the rate of toluene formation decrease by roughly 19% relative to Catalyst A employed in Run 1. Comparison with the 0.6 Pt only catalyst of Run 4 shows the activity advantage for the catalyst of this invention and illustrates the promotional benefit of Ir bound into the alumina support. The data of Run 5 show that the Pt-Ir catalyst of this invention is twice as active as the conventional Pt-Re catalyst.

These comparative data demonstrate the high activity of the Pt-Ir catalyst prepared by the procedure of this invention relative to conventional catalysts. The absence of Ir agglomeration after exposure to flowing air at 510° C. (950° F.) for 21 hr. distinguishes this catalyst from all other Ir containing reforming catalysts known. This stabilization arises from the distribution and anchoring of the Ir into the alumina matrix during the synthesis of the support.

In a further series of runs, Catalysts A–E were employed to reform a Light Arabian paraffinic naphtha at cyclic conditions. The results are given in Table 2.

TABLE 2

CYCLIC REFORMING OF A LIGHT ARAB PARAFFINIC NAPHTHA 510° C. EIT, 175 psig, 3000 SCF/B, 1.9 W/H/W, 100 RON

| Catalyst | Activity At Hr. 50 | Activity At Hr. 100 | $C_5+$ LV % At Hr. 50 | $C_5+$ LV % At Hr. 100 | Wt. % Coke At 100 Hr. |
|---|---|---|---|---|---|
| A (0.5 wt. % Pt—0.3 wt. % Ir) | 87 | 64 | 74.3 | 72.0 | 6.0 |
| B (0.3 wt. % Pt—0.3 wt. % Ir) | 116 | 145 | 73.4 | 67.0 | 3.0 |
| C (0.3 wt. % Pt—0.3 wt. % Ir) | 60 | 53 | 71.0 | 69.5 | 4.7 |
| D (0.6 wt. % Pt) | 57 | 34 | 74.5 | 70.2 | 8.7 |
| E (0.3 wt. % Pt—0.3 wt. % Re) | 55 | 32 | 73.6 | 70.6 | 11.8 |

Catalyst A, the catalyst of this invention, is clearly shown to have both higher activity and yield than the commercial Pt (D) and Pt-Re (E) catalysts. Catalyst A also has better yield stability than these two commercial catalysts, and it produces 30–50% less coke at these high severity conditions. The commercial Pt-Ir catalyst (B) is unsuitable for use at these conditions since its cracking activity leads to high yields of low value light gas and low yields of desired reformate. The agglomerated Pt-Ir catalyst (C) has poor activity and yield. While the commercial Pt-Ir catalysts (B, C) have low coke yields, this benefit is countered by the activity/yield debits. Catalyst A, the catalyst of this invention, is superior to the other catalysts in all respects.

The following examples are further exemplary of catalysts prepared by the impregnation of platinum onto an alumina matrix bound iridium support, and the retention of its capability of promoting platinum reforming activity. The following shows that both rhenium and platinum can be impregnated onto the alumina matrix bound iridium support to further improve catalyst performance.

Immediately following is a description of the preparation of Catalysts F–L employed in these runs.

Catalyst F (0.3 wt.% Pt/0.3 wt.% Re):

A commercial 0.3 Pt-0.3 Re reforming catalyst was calcined in air at 500° C. for 3 hrs., reduced in hydrogen at 500° C. for 17 hrs., and sulfided at 500° C.

Catalyst G (0.3 wt.% Pt/0.3 wt.% Ir):

A commercial 0.3 Pt-0.3 Ir reforming catalyst was calcined in air at 398.2° C. for 3 hrs., reduced in hydrogen at 500° C. for 17 hrs., and sulfided at 500° C.

Catalyst H (0.3 wt.% Pt/0.3 wt.% Re/0.3 wt.% Ir):

A 0.3 Pt-0.3 wt.% Re-0.3 Ir catalyst, Catalyst H, was prepared in the following manner: Into 50 g of conventional reforming alumina extrudates in 75 ml of water carbon dioxide was bubbled for 30 min. To the extrudates were added 5.4 ml of Pt stock (28 mg Pt/ml), 3.0 ml of Re stock (42 mg Re/ml), 8.8 ml of Ir stock (16 mg Ir/ml) and 4.6 ml of Cl stock (60 mg Cl/ml). Carbon dioxide was passed for 4 hrs., and the catalyst was then air dried and vacuum dried at 110° C. for 4 hrs. The catalyst was calcined in air at 398.2° C. for 3 hrs., reduced at 500° C. for 17 hrs., and sulfided at 500° C.

Catalyst I (0.5 wt.% Pt/0.3 wt.% Re/0.1 wt.% Ir):

A 0.5 Pt-0.3 Re-0.1 Ir catalyst was prepared as was Catalyst H except the Pt stock solution amount was increased to 9.0 ml, and the Ir stock solution was decreased to 2.9 ml. The catalyst was calcined at 398.2° C. for 3 hrs., reduced at 500° C. for 17 hrs., and sulfided at 500° C.

Catalyst J (0.3 wt.% Pt/0.3 wt.% Re/0.3 wt.% Ir):

A 0.3 Pt-0.3 Re-0.3 Ir catalyst, Catalyst J, was prepared in the following manner: Into 50 g of 0.3 wt.% Ir containing aluminum in 75 ml of water, carbon dioxide was bubbled for 30 min. To the Ir aluminate were added 5.4 ml of Pt stock (28 mg Pt/ml) and 3.0 ml of Re stock (42 mg Re/ml) and 4.6 ml of Cl stock (60 mg Cl/ml). Carbon dioxide was passed for 4 hrs., and the catalyst was then air dried and vacuum dried at 110° C. for 4 hrs. The catalyst was calcined in air at 500° C. for 3 hrs., reduced at 500° C. for 17 hrs., and sulfided at 500° C.

Catalyst K (0.5 wt.% Pt/0.3 wt.% Re/0.3 wt.% Ir):

A 0.5 Pt-0.3 Re-0.3 Ir catalyst was prepared as was Catalyst J except the Pt stock solution amount was increased to 9.0 ml. The catalyst was also pretreated as was Catalyst J.

Catalyst L (0.5 wt.% Pt/0.3 wt.% Re/0.1 wt.% Ir):

A 0.5 Pt-0.3 Re-0.1 Ir catalyst was prepared as was Catalyst J except the Ir content of the alumina base was decreased from 0.3 to 0.1 wt.%. The catalyst was also pretreated as was Catalyst J.

All of Catalysts F, G, H, I, J, K, and L were employed in heptane reforming tests, the results of which are given in Table 3. The catalysts of this invention, Catalysts J, K, and L, are shown to be comparable to the commercial catalysts, F and G, and their conventional analogs, H and I, in terms of activity and yield. Catalysts J, K and L are more active than Pt-Re (Catalyst F) since the space velocities differ by a factor of 2. In general, Catalysts J, K and L offer marginally improved yields and selectivities. These data illustrate that the Pt-Re-Ir catalyst with Ir bound into the aluminum matrix is competitive in all respects with the conventional bi- and trimetallic catalysts.

TABLE 3

HEPTANE REFORMING WITH Pt—Re—Ir CATALYSTS
n-Heptane, 500° C., 100 psig, $H_2$/Oil = 6

| Catalyst | F | G | H | I | J | K | L |
|---|---|---|---|---|---|---|---|
| W/H/W | 10 | | | 20 | | | |
| Yield, Wt. % | | | | | | | |
| $C_1$ | 1.4 | 1.8 | 1.5 | 1.4 | 1.2 | 1.4 | 1.3 |

TABLE 3-continued
HEPTANE REFORMING WITH Pt—Re—Ir CATALYSTS
n-Heptane, 500° C., 100 psig, H₂/Oil = 6

| Catalyst | F | G | H | I | J | K | L |
|---|---|---|---|---|---|---|---|
| W/H/W | 10 | | | | 20 | | |
| i-C₄ | 3.3 | 2.8 | 2.9 | 2.2 | 2.7 | 2.2 | 2.3 |
| n-C₄ | 5.5 | 5.0 | 5.1 | 5.2 | 4.6 | 4.9 | 4.7 |
| C₅+ | 79.7 | 80.4 | 80.8 | 82.2 | 82.6 | 82.7 | 83.2 |
| Toluene | 31.3 | 29.0 | 30.6 | 30.8 | 27.0 | 29.2 | 27.7 |
| Conversion | 65.3 | 62.3 | 62.8 | 60.9 | 56.4 | 58.7 | 56.3 |
| Toluene Rate | 3.2 | 6.0 | 6.3 | 6.3 | 5.6 | 6.0 | 5.7 |
| Toluene Selectivity | 48.0 | 46.3 | 48.8 | 50.5 | 47.9 | 49.6 | 49.1 |

Catalyst K, after having been employed in heptane reforming at the conditions described by reference to Table 3, was regenerated by burning the coke at 500° C. for 20 hrs. in air. The catalyst was reduced for 3 hrs. at 500° C. and re-evaluated in heptane reforming.

Catalyst K was regenerated two more times in air at 500° C. for 20 hrs. and at 500° C. for 72 hrs.; each time the catalyst was reduced at 500° C. for 3 hrs. and tested in heptane reforming. After roughly 120 hrs. at 500° C. in air, no Ir agglomeration was detectable in Catalyst K. The results of the heptane reforming study are summarized in Table 4. The data show no loss in catalyst performance as a consequence of this simple, high severity regeneration.

TABLE 4
HEPTANE REFORMING WITH CATALYST K
n-Heptane, 500° C., 100 psig, 20 W/H/W, H₂/Oil = 6

| Cycle | 1st | 2nd | 3rd | 4th |
|---|---|---|---|---|
| Yield, Wt. % | | | | |
| C₁ | 1.4 | 1.7 | 1.8 | 1.7 |
| i-C₄ | 2.2 | 2.0 | 1.8 | 1.5 |
| n-C₄ | 4.9 | 3.6 | 3.5 | 3.5 |
| C₅+ | 82.7 | 85.4 | 86.0 | 86.7 |
| Toluene | 29.2 | 30.0 | 29.3 | 27.8 |
| Conversion | 58.7 | 56.7 | 55.0 | 52.4 |
| Toluene Rate | 6.0 | 6.2 | 6.0 | 5.7 |
| Toluene Selectivity | 49.6 | 52.4 | 52.9 | 52.7 |

Catalysts F, and J, K, L were next used to reform a Light Arab paraffinic naphtha at cyclic severity. The results are summarized in Table 5.

TABLE 5
CYCLIC REFORMING OF A LIGHT ARAB PARAFFINIC NAPHTHA 510° C., 175 psig, 3000 SCF/B, 1.9 W/H/W

| Catalyst | Activity At Hr. | | C₅+ LV % At 100 RON at Hr. | |
|---|---|---|---|---|
| | 50 | 100 | 50 | 100 |
| F (0.3 wt. % Pt-0.3 wt. % Re) | 55 | 32 | 73.6 | 70.6 |
| J (0.3 wt. % Pt-0.3 wt. % Re-0.3 wt. % Ir) | 65 | 41 | 76.5 | 74.0 |
| K (0.5 wt. % Pt-0.3 wt. % Re-0.3 wt. % Ir) | 73 | 46 | 76.3 | 75.0 |
| L (0.5 wt. % Pt-0.3 wt. % Re-0.1 wt. % Ir) | 68 | 32 | 75.5 | 73.5 |

These data show that the catalysts of this invention provide clear activity and yield credits over the commercial Pt-Re catalyst.

It is apparent that various modifications and changes can be made without departing from the spirit and scope of the present invention.

Having described the invention, what is claimed is:

1. A process for improving the octane quality of a naphtha comprising contacting said naphtha at reforming conditions with a catalyst composite comprising an iridium component in concentration ranging from about 0.001 percent to about 2 percent dispersed throughout, and bound within an alumina support matrix, a platinum component in concentration ranging from about 0.001 percent to about 2 percent dispersed upon said iridium-containing alumina support, and a halogen component dispersed thereon in concentration ranging from about 0.01 percent to about 2 percent, based on the total weight of the catalyst, said iridium component being dispersed throughout and bound within said alumina support even when the composition is subjected to temperatures ranging above about 426.7° C. at oxygen concentrations ranging above about 0.1 percent, based on the volume of the gas contacted with the catalyst, for periods ranging from about 1 hour to about 48 hours.

2. The process of claim 1 wherein the catalyst contains from about 0.01 to about 1.5 percent iridium, from about 0.01 to about 1.5 percent platinum, and from about 0.3 percent to about 1.6 percent halogen.

3. The process of claim 1 wherein the catalyst contains from about 0.01 to about 1 percent iridium, from about 0.05 to about 1 percent platinum, and from about 0.6 percent to about 1.5 percent halogen.

4. The process of claim 1 wherein the catalyst contains from about 0.001 percent to about 1 percent of a promoter metal added to the alumina support matrix within which the iridium is dispersed, and bound, said promoter metal being selected from the group consisting of copper, tin, rhenium, palladium, rhodium, tungsten, ruthenium, osmium, silver, gold, gallium, lead, bismuth, and antimony.

5. The process of claim 4 wherein the promoter metal added to the alumina support matrix within which the iridium is dispersed, and bound, is rhenium.

6. The process of claim 1 wherein the iridium component of the catalyst remains dispersed and bound within the alumina support component at temperatures ranging from about 450° C. to about 650° C., oxygen concentrations ranging from about 0.1 percent to about 21 percent, for a period ranging from about 1 hour to about 48 hours.

* * * * *